(12) United States Patent
Branton et al.

(10) Patent No.: US 12,296,546 B2
(45) Date of Patent: May 13, 2025

(54) APPARATUS AND METHOD FOR MANUFACTURING A COMPOSITE PART TO PROVIDE SMOOTH JOIN SURFACES OF THE COMPOSITE PART

(71) Applicant: The Boeing Company, Chicago, IL (US)

(72) Inventors: Jennifer F. Branton, Summerville, SC (US); Richard E. Heath, Mount Pleasant, SC (US); Michael C. Hargrove, Goose Creek, SC (US)

(73) Assignee: The Boeing Company, Arlington, VA (US)

( * ) Notice: Subject to any disclaimer, the term of this patent is extended or adjusted under 35 U.S.C. 154(b) by 221 days.

(21) Appl. No.: 18/058,942

(22) Filed: Nov. 28, 2022

(65) Prior Publication Data
US 2024/0173928 A1 May 30, 2024

(51) Int. Cl.
*B29C 70/44* (2006.01)
*B29C 70/70* (2006.01)

(52) U.S. Cl.
CPC ............ *B29C 70/446* (2013.01); *B29C 70/70* (2013.01)

(58) Field of Classification Search
None
See application file for complete search history.

(56) References Cited

U.S. PATENT DOCUMENTS

| | | | |
|---|---|---|---|
| 11,358,348 B2 | 6/2022 | Autry | |
| 2013/0344291 A1 | 12/2013 | Pearson et al. | |
| 2019/0176414 A1 | 6/2019 | Kendall et al. | |
| 2020/0231267 A1* | 7/2020 | Rotter | B64C 1/064 |
| 2020/0282676 A1* | 9/2020 | Hilton | B29D 99/0014 |

OTHER PUBLICATIONS

European Patent Office, Extended European Search Report, App. No. 23199419.5 (Mar. 21, 2024).

* cited by examiner

*Primary Examiner* — S. Behrooz Ghorishi
*Assistant Examiner* — Gregory C. Grosso
(74) *Attorney, Agent, or Firm* — Walters & Wasylyna LLC

(57) ABSTRACT

A composite-part manufacturing method comprises placing a bladder against a trough surface of a tool that has a tool radius portion elongating between the trough surface and a major surface of the tool, and placing a radius filler in vicinity of the tool radius portion. The method also comprises applying a peel-away ply over the radius filler, and applying at least one material layer on the peel-away ply. The method further comprises after the at least one material layer has been applied on the peel-away ply, moving the peel-away ply away from the bladder and the major surface of the tool and thereby to move the radius filler along with the peel-away ply away from the tool radius portion to form a composite part having a smooth join surface in vicinity of the tool radius portion.

20 Claims, 10 Drawing Sheets

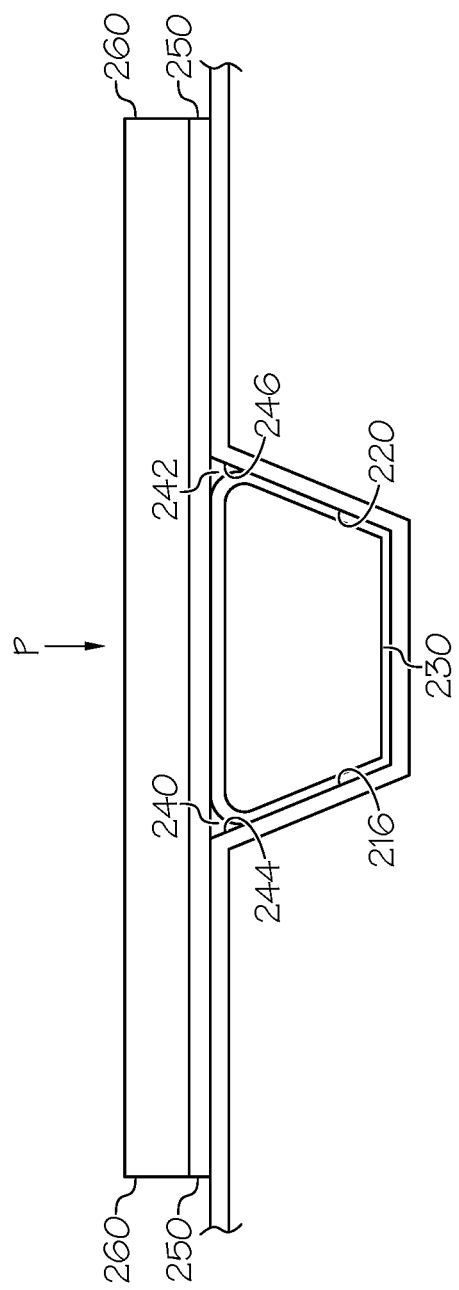

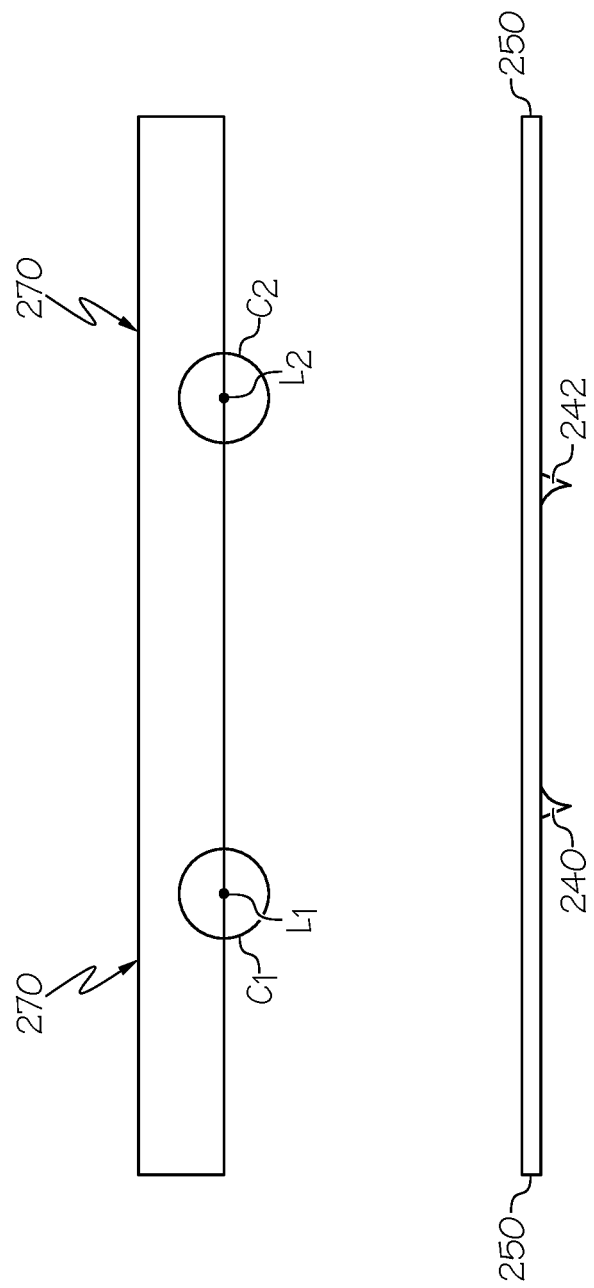

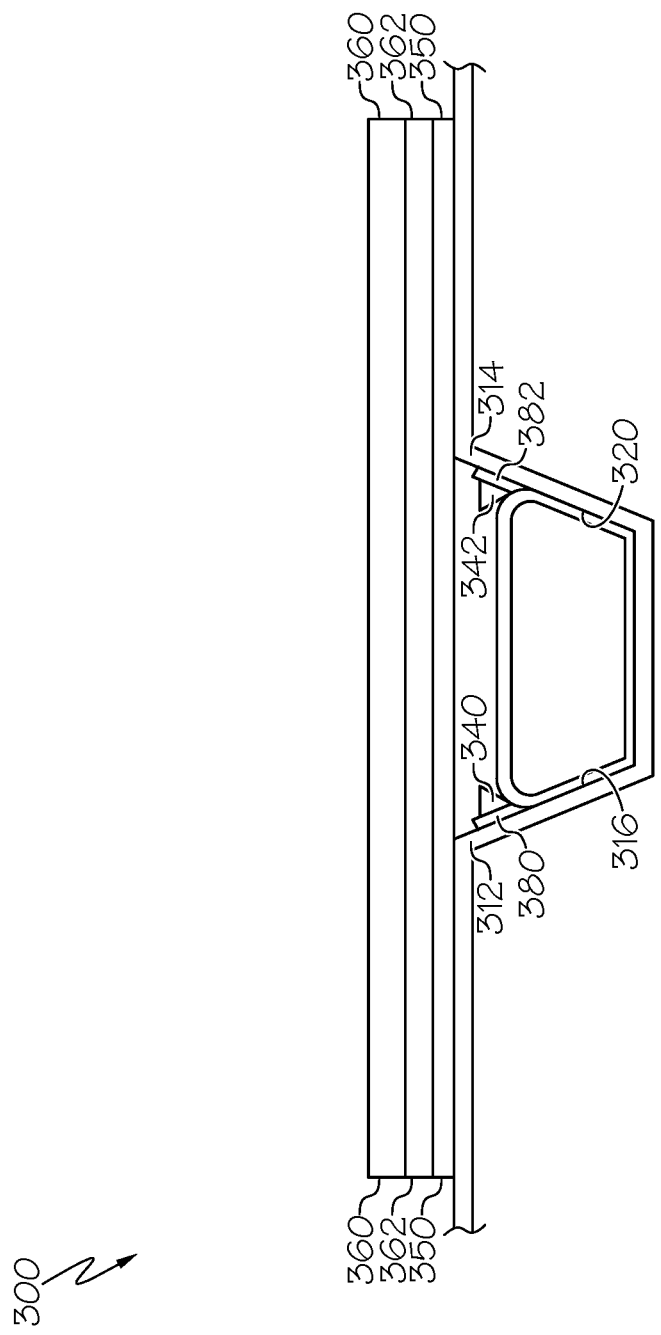

APPARATUS AND METHOD FOR MANUFACTURING A COMPOSITE PART TO PROVIDE SMOOTH JOIN SURFACES OF THE COMPOSITE PART

FIELD

The present application relates to composite parts, and is particularly directed to an apparatus and method for manufacturing a composite part to provide smooth join surfaces of the composite part, such as an aerospace part having one or more stringers.

BACKGROUND

Aircraft generally include an airframe, which may be regarded as an underlying skeleton to which skins are attached to form a smooth aerodynamic outer surface. Elongated structural members called stringers are typically connected to the inside surface of the skins to provide flexural and torsional stiffness to the skins. As an example, hat stringers are commonly used for stiffening fuselage sections and wing skins on aircraft.

Composite materials, such as carbon fiber-reinforced thermoset (e.g., epoxy-based) plastics, have high strength-to-weight ratios and, therefore, are used in aircraft to decrease the overall weight of the aircraft. Modern aircraft may include both composite stringers and composite skins. The composite stringers and the composite skins may be cured together (e.g., co-cured), thereby avoiding the need for mechanical fasteners for securing the stringers to the skins. However, when composite stringers are cured together with composite skins, irregularities, such as bumps, have been observed on the skin surface opposed from the stringer. Such irregularities may require additional surface finishing steps (e.g., sanding) or complete rework of the part, thereby substantially increasing manufacturing costs.

Accordingly, those skilled in the art continue with research and development efforts in the field of composite parts manufacturing, including the manufacture of aerospace parts having stringers.

SUMMARY

In one aspect, a composite-part manufacturing method comprises placing a bladder against a trough surface of a tool that has a tool radius portion elongating between the trough surface and a major surface of the tool, and placing a radius filler in vicinity of the tool radius portion. The method also comprises applying a peel-away ply over the radius filler, and applying at least one material layer on the peel-away ply. The method further comprises after the at least one material layer has been applied on the peel-away ply, moving the peel-away ply away from the bladder and the major surface of the tool and thereby to move the radius filler along with the peel-away ply away from the tool radius portion to form a composite part having a smooth join surface in vicinity of the tool radius portion.

In another aspect, a composite-part manufacturing apparatus comprises a tool having a tool radius portion that elongates between a tool trough surface and a tool major surface, and a bladder disposed in vicinity of the tool trough surface. The apparatus also comprises a radius filler disposed in vicinity of the tool radius portion. The apparatus further comprises a detachable peel-away ply facing the tool radius portion, and at least one material layer over the detachable peel-away ply.

In yet another aspect, a composite-part manufacturing apparatus comprises a tool having a tool radius portion that elongates between a tool trough surface and a tool major surface, and a bladder pressed against the tool trough surface. The apparatus also comprises a radius filler in direct contact with the tool radius portion, and a detachable peel-away ply in direct contact with the radius filler, the bladder, and the tool. The apparatus further comprises at least one material layer on the detachable peel-away ply.

Other examples of the disclosed apparatuses and methods will become apparent from the following detailed description, the accompanying drawings and the appended claims.

BRIEF DESCRIPTION OF THE DRAWINGS

FIG. 2A is a schematic diagram similar to FIG. 2, and showing components in different positions during a forming process as the composite part is being manufactured.

FIG. 2C is a schematic diagram only a portion of FIG. 2B, and showing a schematic view of a manufactured composite part after a peel-away ply along with radius fillers have been removed.

FIG. 3 is a schematic diagram similar to FIG. 2, and showing an apparatus according to another embodiment.

DETAILED DESCRIPTION

The present application is directed to an apparatus and method for manufacturing a composite part to provide smooth join surfaces of the composite part. The specific construction of the apparatus and method therefor and the industry in which the apparatus and method are implemented may vary. It is to be understood that the disclosure below provides a number of embodiments or examples for implementing different features of various embodiments. Specific examples of components and arrangements are described to simplify the present disclosure. These are merely examples and are not intended to be limiting.

By way of example, the disclosure below describes an apparatus and method for manufacturing a composite part to provide smooth join surfaces of the composite part, such as an aerospace part having one or more stringers. The apparatus and method may be implemented by an original equipment manufacturer (OEM) in compliance with military and space regulations. It is conceivable that the disclosed apparatus and method may be implemented in many other manufacturing industries.

Figure 1:
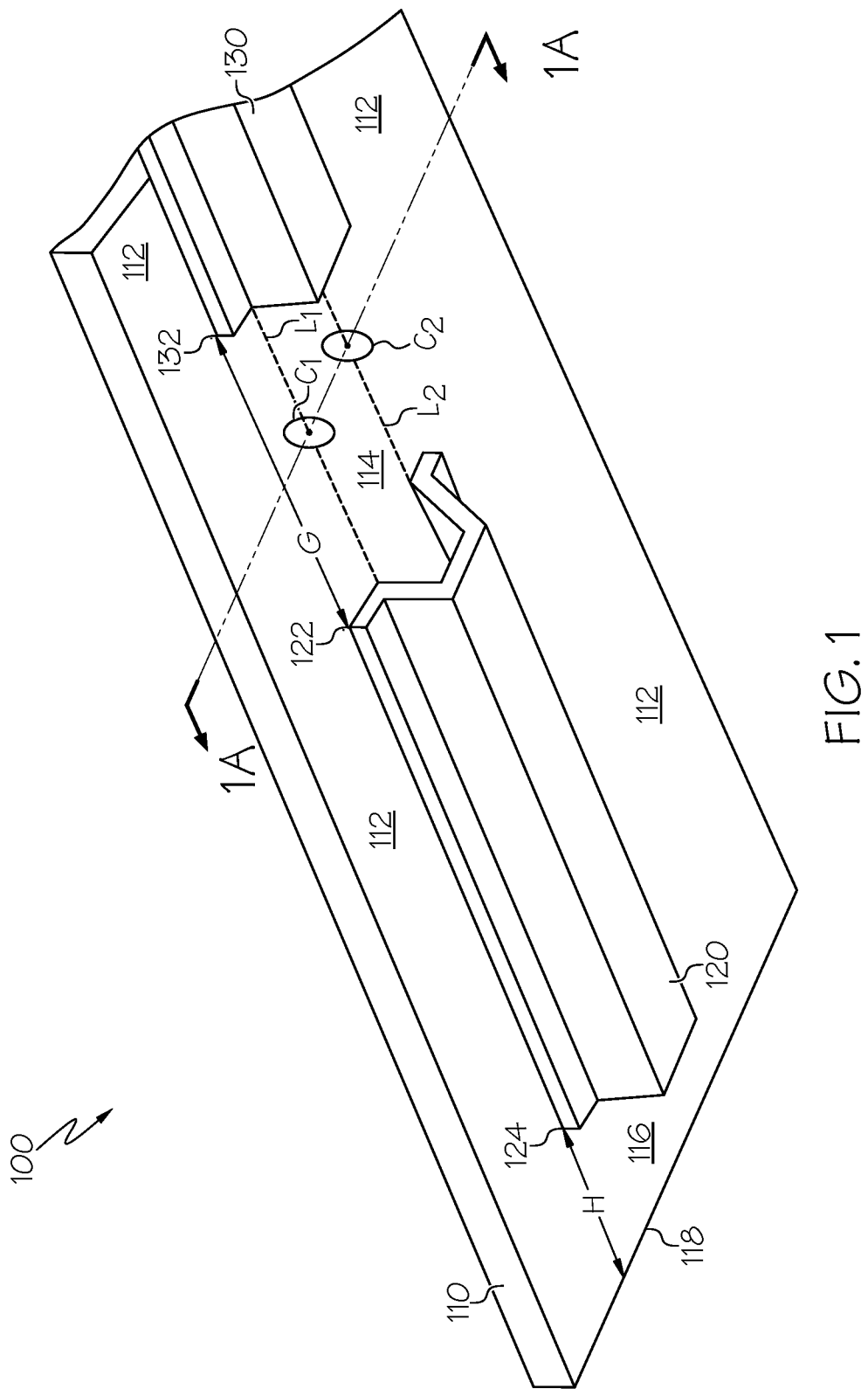
FIG. 1 is a perspective view of a composite part having stringers constructed in accordance with an embodiment.

Referring to FIG. 1, a perspective view of a composite part having stringers constructed in accordance with an embodiment is illustrated. As shown in FIG. 1, a composite part 100 comprises a panel portion 110 having a major side surface 112, a first stringer portion 120 attached to the major side surface 112 of the panel portion 110, and a second stringer portion 130 (shown only partially in FIG. 1) that is also attached to the major side surface 112 of the panel portion 110. A spatial region, designated with arrow lines and reference letter "G," separates a termination 122 of the first stringer portion 120 and a termination 132 of the second stringer portion 130.

A surface portion 114 of the major side surface 112 of the panel portion 110 lies within the spatial region G. The surface portion 114 of the major side surface 112 of the panel portion 110 is smooth and bump-free as a result of using an apparatus and method for manufacturing the composite part in accordance with an aspect of the present disclosure. In particular, a surface area generally along a first dashed longitudinal line L1 that is on the surface portion 114 and another surface area generally along a second dashed longitudinal line L2 that is also on the surface portion 114 are especially smooth and bump-free, as will be described in detail hereinbelow.

Although the detailed description herein describes the surface portion 114 within the spatial region G as being smooth and bump-free, it is contemplated that other surface portions of the major side surface 112 of the panel portion 110 could also be smooth and bump-free by implementing aspects of the present disclosure. For example, a spatial region, designated with arrow lines and reference letter "H," separates an opposite termination 124 of the first stringer portion 120 and an edge 118 of the panel portion 110. Other surface portions of the major side surface 112 of the panel portion 110 within other spatial regions in vicinity of a stringer portion (e.g., the first stringer portion 120 shown in FIG. 1) are possible. For purpose of description, only surface portion 114 within the spatial region G will be described.

Figure 1A:
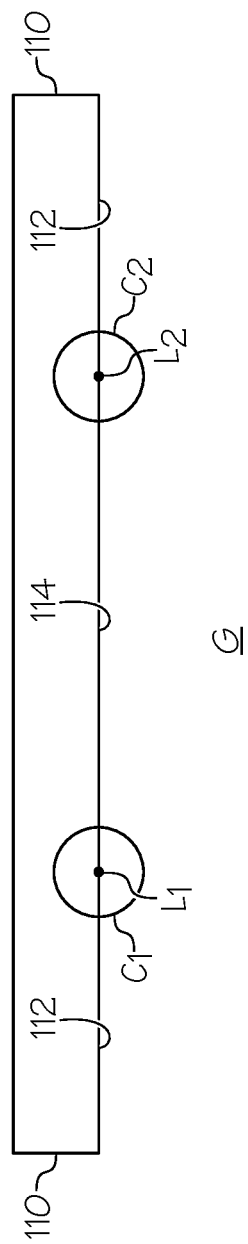
FIG. 1A is a cross-sectional view, taken approximately along line 1A-1A of FIG. 1, showing features within a spatial region that is defined between two stringers of the composite part.

Referring to FIG. 1A, a cross-sectional view, taken approximately along line 1A-1A of FIG. 1, is illustrated. FIG. 1A shows features (from a different viewpoint) of the spatial region G (see also FIG. 1) that is defined between the first and second stringer portions 120, 130. In particular, a first circle C1 includes the first dashed longitudinal line L1 that extends into the page (as viewed looking at FIG. 1A), and a second circle C2 includes the second dashed longitudinal line L2 that also extends into the page. Each of the first and second circles C1, C2 shown in FIG. 1A is also shown in FIG. 1 to facilitate visualizing the relationship between FIGS. 1 and 1A.

Figure 2:
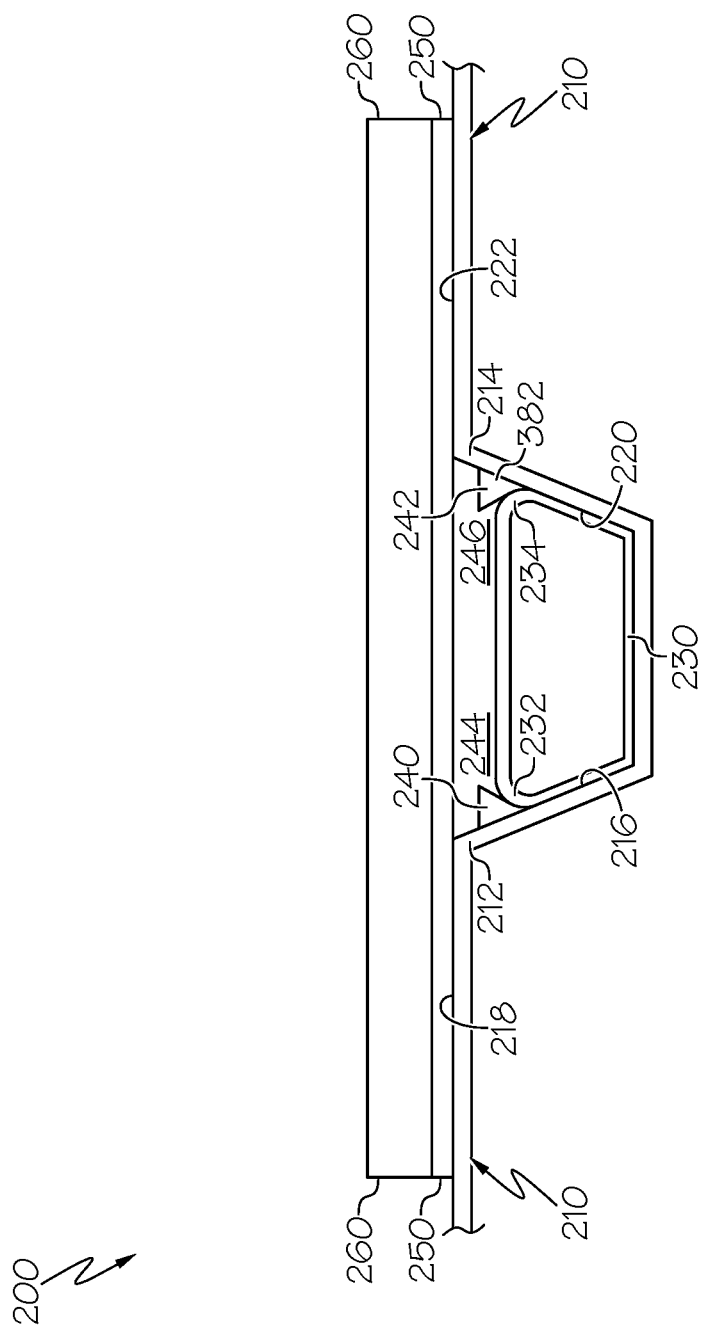
FIG. 2 is a schematic diagram of an apparatus for manufacturing the composite part of FIG. 1 to provide smooth join surfaces within the spatial region of FIG. 1A, according to an embodiment.

Referring to FIG. 2, a schematic diagram is illustrated of an apparatus 200 for manufacturing the composite part 100 of FIG. 1 to provide smooth, bump-free surfaces within the spatial region G of FIG. 1A, according to an embodiment. The apparatus 200 comprises a tool 210 having a first tool radius portion 212 and a second tool radius portion 214. The first tool radius portion 212 elongates between a first tool trough surface 216 and a first tool major surface 218. The second tool radius portion 214 elongates between a second tool trough surface 220 and a second tool major surface 222. A bladder 230 has a first bladder radius portion 232 that is disposed in vicinity of the first tool trough surface 216, and a second bladder radius portion 234 that is disposed in vicinity of the second tool trough surface 220. The bladder 230 may be any type of bladder, such as an inflatable bladder.

A first radius filler 240 is located between the first tool radius portion 212 and the first bladder radius portion 232. A second radius filler 242 is located between the second tool radius portion 214 and the second bladder radius portion 234. Each of the first and second radius fillers 240, 242 comprises a thermoset resin that may contain at least some carbon fiber as reinforcement material.

A detachable peel-away ply 250 faces the first and second radius fillers 240, 242, the first and second tool radius portions 212, 214, the first and second bladder radius portions 232, 234, and the first and second tool major surfaces 218, 222. A pre-cured material layer may comprise the peel-away ply 250. The first radius filler 240 is positioned in a first void space 244 that is defined by the peel-away ply 250, the first bladder radius portion 232, and the first tool trough surface 216. The second radius filler 242 is positioned in a second void space 246 that is defined by the peel-away ply 250, the second bladder radius portion 234, and the second tool trough surface 220.

Referring to FIG. 2A, a schematic diagram similar to FIG. 2 is illustrated, and shows components in different positions during a forming process as the composite part 100 of FIG. 1 is being manufactured. In FIG. 2A, the bladder 230 is inflated to a pressure sufficient for each of the radius fillers 240, 242 to be pressed against the peel-away ply 250. As such, the peel-away ply 250 is in direct contact with the first and second radius fillers 240, 242.

As shown in FIG. 2A, a downward pressure P (e.g., six atmospheres of pressure) is applied on the at least one material layer 260 over the peel-away ply 250 to form the composite part 100 of FIG. 1 that is being manufactured. When components are in their positions shown in FIG. 2A, each of the radius fillers 240, 242 is squeezed and compressed in their respective void spaces 244, 246. The bladder 230 cooperates with the first and second radius fillers 240, 242 to press against the peel-away ply 250 which, in turn presses against the at least one material layer 260 to prevent material from flowing into the void spaces 244, 246 during the forming process.

Figure 2B:
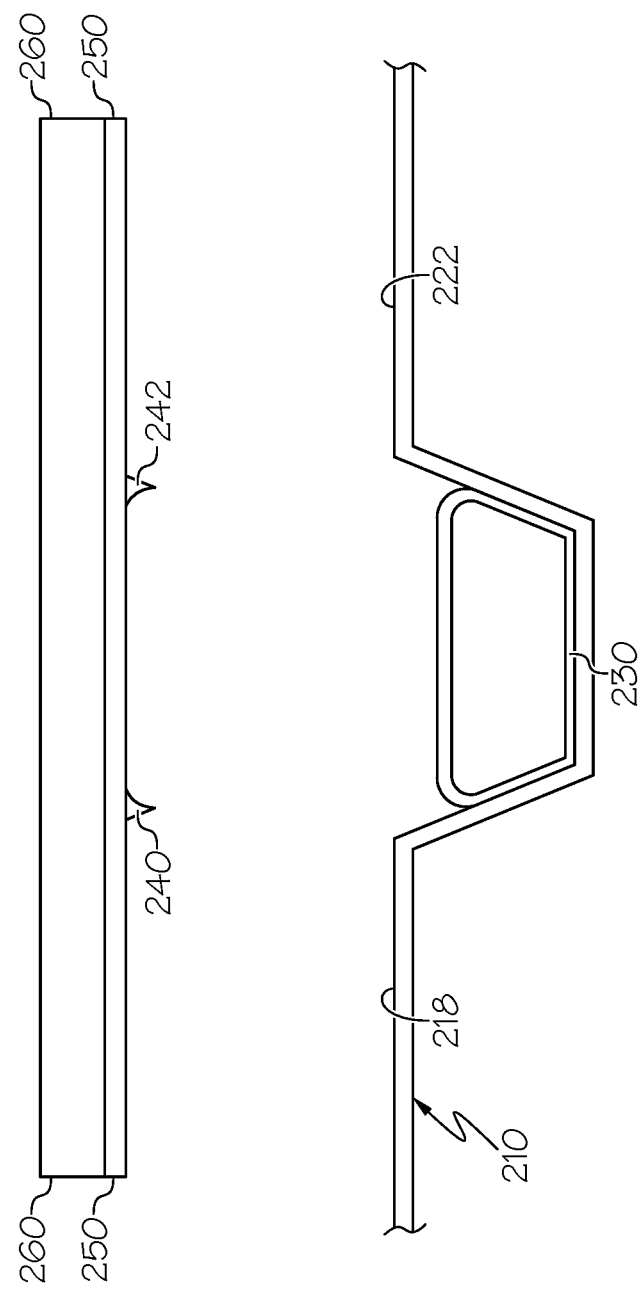
FIG. 2B is a schematic diagram similar to FIG. 2A, and showing components in different positions during a demolding process as the composite part is being manufactured.

Referring to FIG. 2B, a schematic diagram similar to FIG. 2A is illustrated, and shows components in different positions during a demolding process as the composite part 100 of FIG. 1 is being manufactured. In FIG. 2B, the peel-away ply 250 is peeled and moved away from the bladder 230 (shown deflated) and the first and second tool major surfaces 218, 222 of the tool 210. When this occurs, the at least one material layer 260 on the peel-away ply 250 and the first and second radius fillers 240, 242 adhered to the peel-away ply 250 are also moved away from the bladder 230 and the first and second tool major surfaces 218, 222 of the tool 210. The at least one material layer 260 along with the peel-away ply 250 and the first and second radius fillers 240, 242 adhered thereto are demolded from the tool 210.

Referring to FIG. 2C, a schematic diagram only a portion of FIG. 2B is illustrated, and shows a schematic view of a manufactured composite part 270 after the peel-away ply 250 along with the first and second radius fillers 240, 242 have been removed (i.e., detached and peeled away from the composite part 270 that has just been manufactured). The peel-away ply 250 and the first and second radius fillers 240, 242 are thrown away.

As shown in FIG. 2C, the view of the manufactured composite part 270 (after the peel-away ply 250 along with the first and second radius fillers 240, 242 have been detached and peeled away) corresponds to the view of the composite part 100 shown in FIG. 1A. For purpose of description, the first and second circles C1, C2 including their respective first and second dashed longitudinal lines L1, L2 shown in FIGS. 1 and 1A are superimposed onto the view of the composite part 270 shown in FIG. 2C.

In accordance with an aspect of the present disclosure, the manufactured composite part 270 of FIG. 2C has smooth join surfaces in vicinity of where the bladder 230 and the first and second radius fillers 240, 242 were previously compressed between the peel-away ply 250 and the first and second tool trough surfaces 216, 220 during the forming process of FIG. 2A. Join surfaces at these locations where the first and second radius fillers 240, 242 previously occupied are smooth and bump-free. The smooth and bump-free join surfaces are disposed generally along the first and second dashed longitudinal lines L1, L2, which as described hereinabove with reference to FIGS. 1 and 1A, are on the surface portion 114 of the major side surface 112 of the panel portion 110.

A number of advantages are provided by providing smooth, bump-free join surfaces at locations where the first and second radius fillers 240, 242 previously occupied. One advantage is that join surface bumps are eliminated or at least greatly reduced. Accordingly, the labor needed to rework bumpy join surfaces to provide smooth join surfaces is reduced, resulting in substantial labor-cost savings.

Another advantage is that the first and second radius fillers 240, 242 are easy to install as compared to use of bladders and cauls, which take more time and are more difficult to install. Moreover, the first and second radius fillers 240, 242 essentially have no impact on the bladder 230, resulting in no damage to the bladder 230. The result is material-cost savings as well as labor-cost savings.

It should be apparent that the first and second radius fillers 240, 242 act like stiffened, extended "noodles" to provide resilience and flexibility in handling them, and to provide sufficient resistance to compression in the void spaces 244, 246 and thereby to prevent material from flowing into the void spaces 244, 246 during manufacturing of the composite part 270.

Referring to FIG. 3, a schematic diagram similar to FIG. 2 is illustrated, and shows an apparatus 300 according to another embodiment. In FIG. 3, a first tacky substance 380 is optionally disposed on a first tool trough surface 316 in vicinity of a first tool radius portion 312, and a second tacky substance 382 is optionally disposed on a second tool trough surface 320 in vicinity of a second tool radius portion 314. The first and second tacky substances 380, 382 are provided for maintaining position of first and second radius fillers 340, 342 relative to the first and second tool radius portions 312, 314, respectively. Each of the first and second tacky substances 380, 382 may comprise a liquid adhesive. Also, at least one material layer 360 over a peel-away ply 350 optionally includes at least one curable material layer 362. If the at least one material layer 360 over the peel-away ply 350 includes the at least one curable material layer 362, the curable material layer 362 cures during a forming step, such as described hereinabove with reference to FIG. 2A.

Figure 4:
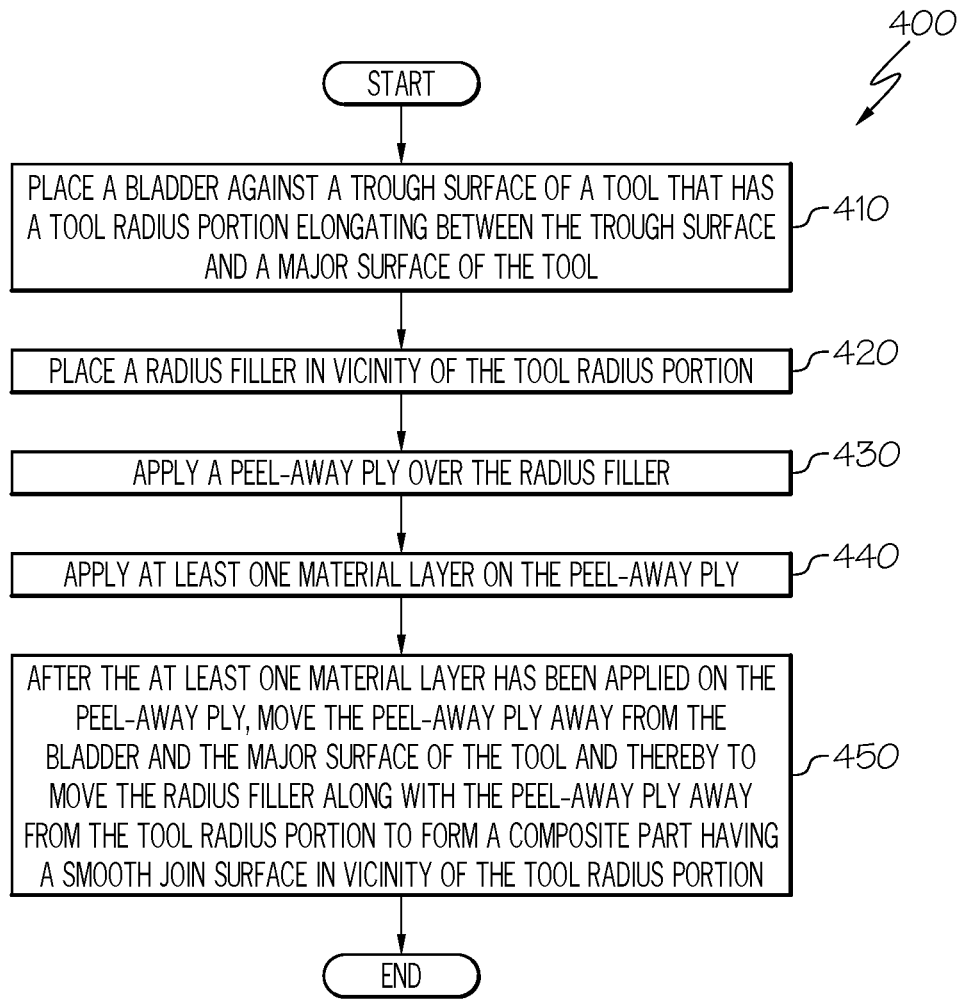
FIG. 4 is a block diagram of a method for manufacturing a composite part to provide smooth join surfaces of the composite part, according to an embodiment.

Referring to FIG. 4, a flow diagram 400 is illustrated of a method for manufacturing a composite part to provide smooth join surfaces of the composite part, according to an embodiment. In block 410, a bladder is placed against a trough surface of a tool that has a tool radius portion elongating between the trough surface and a major surface of the tool. The process proceeds to block 420 in which a radius filler is placed in vicinity of the tool radius portion. Then in block 430, a peel-away ply is applied over the radius filler. The process proceeds to block 440 in which at least one material layer is applied on the peel-away ply. Then in block 450, after the at least one material layer has been applied on the peel-away ply, the peel-away ply is moved away from the bladder and the major surface of the tool and thereby to move the radius filler along with the peel-away ply away from the tool radius portion to form a composite part having a smooth join surface in vicinity of the tool radius portion. The process then ends.

In some embodiments, a thermoset resin is placed in vicinity of the tool radius portion. In some embodiments, a thermoset resin that contains at least some carbon fiber as reinforcement material is placed in vicinity of the tool radius portion.

In some embodiments, a pre-cured material layer comprising the peel-away ply is applied over the radius filler. In some embodiments, the pre-cured material layer comprising the peel-away ply is applied over the radius filler such that the peel-away ply faces the tool radius portion and is in direct contact with the tool radius portion.

In some embodiments, the peel-away ply is in direct contact with the radius filler.

In some embodiments, at least one curable material layer is applied on the peel-away ply. In some embodiments, the at least one curable material layer is allowed to cure. In some embodiments, after the at least one material layer has cured, the peel-away ply is moved away from the bladder and the major surface of the tool and thereby to move the radius filler along with the peel-away ply away from the tool radius portion to form a composite part having a smooth join surface in vicinity of the tool radius portion.

In some embodiments, the at least one material layer including the peel-away ply with the radius filler attached to the peel-away ply is demolded.

In some embodiments, a tacky substance is applied in vicinity of the tool radius portion to allow the tacky substance to maintain position of the radius filler relative to the tool radius portion. In some embodiments, a liquid adhesive is applied in vicinity of the tool radius portion.

In some embodiments, an aerospace part having a number of stringers is manufactured according to the method of FIG. 4.

Figure 5:
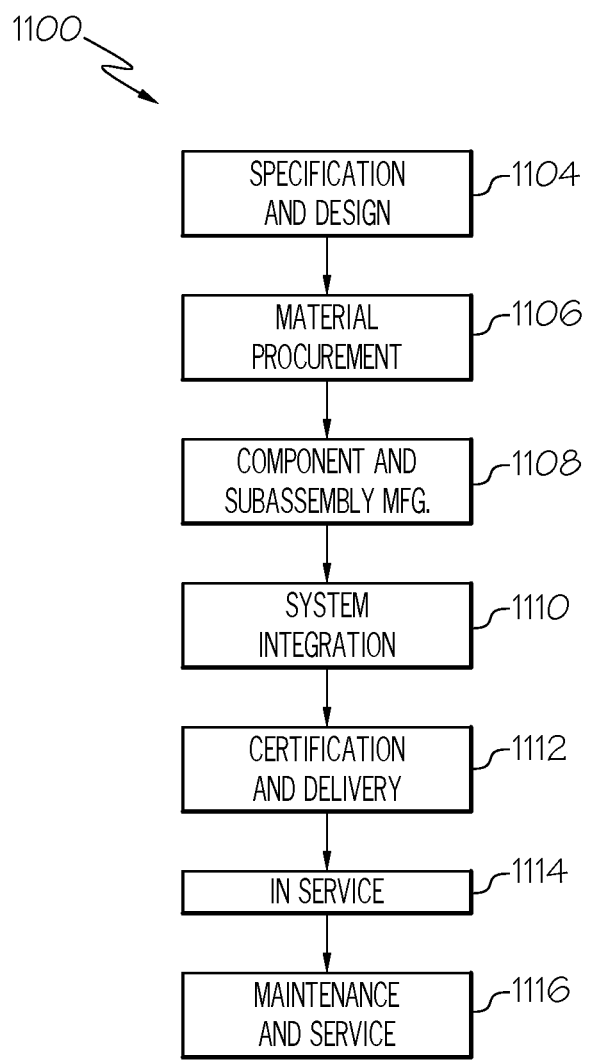
FIG. 5 is a block diagram of aircraft production and service methodology.
Figure 6:
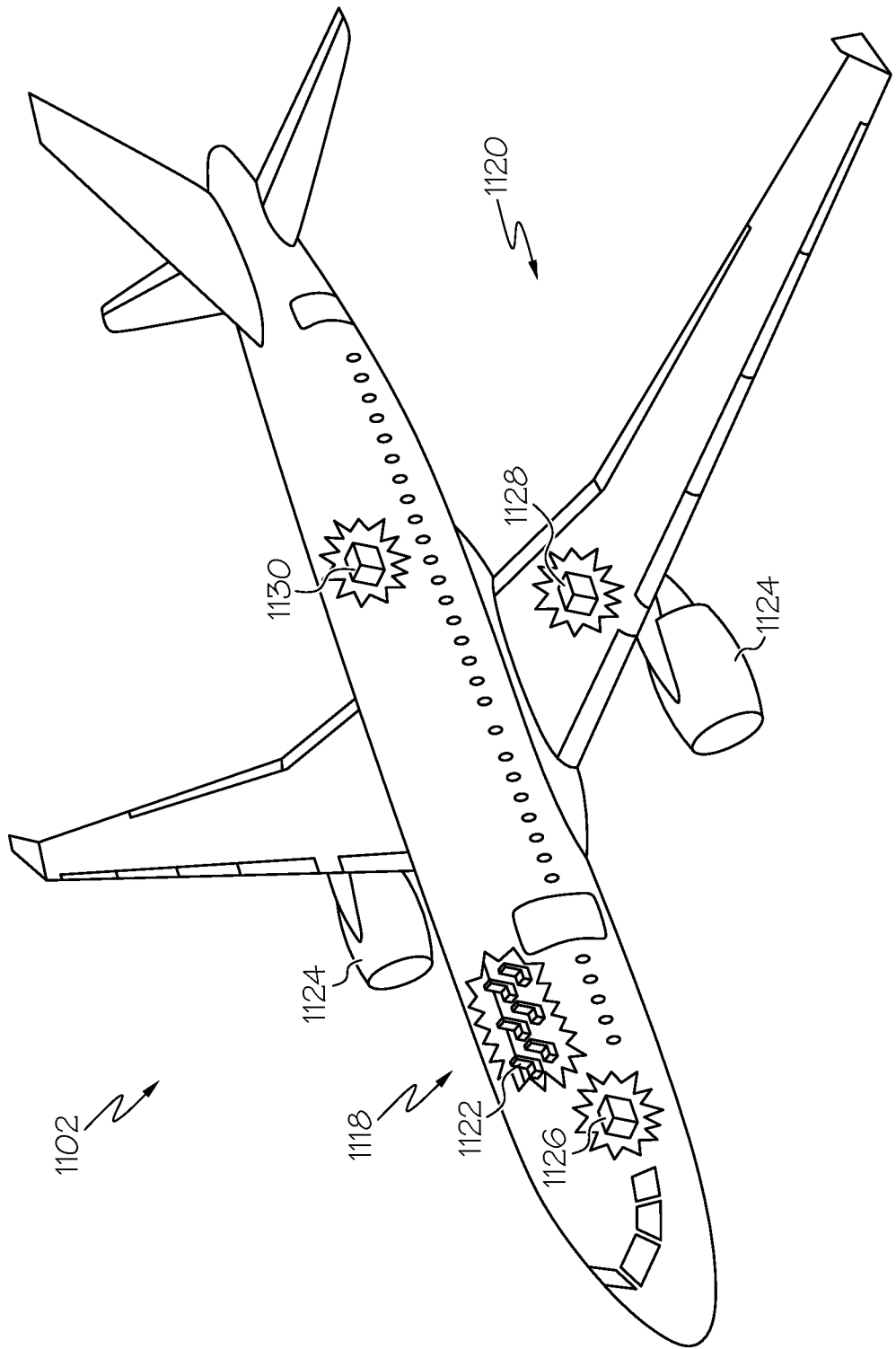
FIG. 6 is a schematic illustration of an aircraft.

Examples of the disclosure may be described in the context of an aircraft manufacturing and service method 1100, as shown in FIG. 5, and an aircraft 1102, as shown in FIG. 6. During pre-production, the aircraft manufacturing and service method 1100 may include specification and design 1104 of the aircraft 1102 and material procurement 1106. During production, component/subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine maintenance and service 1116, which may also include modification, reconfiguration, refurbishment and the like.

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 6, the aircraft 1102 produced by example method 1100 may include an airframe 1118 with a plurality of systems 1120 and an interior 1122. Examples of the plurality of systems 1120 may include one or more of a propulsion system 1124, an electrical system 1126, a hydraulic system 1128, and an environmental system 1130. Any number of other systems may be included.

The disclosed apparatus and method may be employed during any one or more of the stages of the aircraft manufacturing and service method 1100. As one example, components or subassemblies corresponding to component/subassembly manufacturing 1108, system integration 1110, and/or maintenance and service 1116 may be assembled using the disclosed apparatus and method. As another example, the airframe 1118 may be constructed using the disclosed apparatus and method. Also, one or more apparatus examples, method examples, or a combination thereof may be utilized during component/subassembly manufacturing 1108 and/or system integration 1110, for example, by substantially expediting assembly of or reducing the cost of an aircraft 1102, such as the airframe 1118 and/or the interior 1122. Similarly, one or more of apparatus examples, method examples, or a combination thereof may be utilized while the aircraft 1102 is in service, for example and without limitation, to maintenance and service 1116.

Different examples of the apparatuses and methods disclosed herein include a variety of components, features, and functionalities. It should be understood that the various examples of the apparatuses and methods disclosed herein may include any of the components, features, and functionalities of any of the other examples of the apparatuses and methods disclosed herein in any combination, and all of such possibilities are intended to be within the scope of the present disclosure.

The above-described apparatus and method are described in the context of an aircraft. However, one of ordinary skill in the art will readily recognize that the disclosed apparatus and method are suitable for a variety of applications, and the present disclosure is not limited to aircraft manufacturing applications. For example, the disclosed apparatus and method may be implemented in various types of vehicles including, for example, helicopters, passenger ships, automobiles, marine products (boat, motors, etc.) and the like. Non-vehicle applications are also contemplated.

Also, although the above-description describes an apparatus and method for predicting material properties of an aerospace part (e.g., an aircraft part) to be additive-manufactured in the aviation industry in accordance with military and space regulations, it is contemplated that the system and method may be implemented to facilitate for predicting material properties of a part to be additive-manufactured in any industry in accordance with the applicable industry standards. The specific apparatus and method can be selected and tailored depending upon the particular application.

Further, although various aspects of disclosed embodiments have been shown and described, modifications may occur to those skilled in the art upon reading the specification. The present application includes such modifications and is limited only by the scope of the claims.

What is claimed is:

1. A composite-part manufacturing method comprising:
   placing a bladder against a trough surface of a tool that has a tool radius portion elongating between the trough surface and a major surface of the tool;
   placing a radius filler in vicinity of the tool radius portion;
   applying a peel-away ply over at least a portion of the bladder, the radius filler, and the major surface of the tool;
   applying at least one material layer on the peel-away ply; and
   after the at least one material layer has been applied on the peel-away ply, moving the peel-away ply away from the bladder and the major surface of the tool and thereby to move the radius filler along with the peel-away ply away from the tool radius portion to form a composite part having a smooth join surface in vicinity of the tool radius portion.

2. The method of claim 1 wherein placing a radius filler in vicinity of the tool radius portion includes:
   placing a thermoset resin in vicinity of the tool radius portion.

3. The method of claim 2 wherein placing a thermoset resin in vicinity of the tool radius portion includes:
   placing a thermoset resin that contains at least some carbon fiber as reinforcement material in vicinity of the tool radius portion.

4. The method of claim 1 wherein applying a peel-away ply over the radius filler includes:
   applying a pre-cured material layer comprising the peel-away ply over the radius filler.

5. The method of claim 4 wherein applying a pre-cured material layer comprising the peel-away ply over the radius filler includes:
   applying the pre-cured material layer over the radius filler such that the peel-away ply faces the tool radius portion and is in direct contact with the tool radius portion.

6. The method of claim 1 wherein applying a peel-away ply over the radius filler includes:
   applying the peel-away ply in direct contact with the radius filler.

7. The method of claim 1 wherein applying at least one material layer on the peel-away ply includes:
   applying at least one curable material layer on the peel-away ply.

8. The method of claim 7 further comprising:
   allowing the at least one curable material layer to cure.

9. The method of claim 8 wherein after the at least one material layer has been applied on the peel-away ply, moving the peel-away ply away from the bladder and the major surface of the tool and thereby to move the radius filler along with the peel-away ply away from the tool radius portion to form a composite part having a smooth join surface in vicinity of the tool radius portion includes:
   after the at least one material layer has cured, moving the peel-away ply away from the bladder and the major surface of the tool and thereby to move the radius filler along with the peel-away ply away from the tool radius portion to form a composite part having a smooth join surface in vicinity of the tool radius portion.

10. The method of claim 1 wherein after the at least one material layer has been applied on the peel-away ply, moving the peel-away ply away from the bladder and the major surface of the tool and thereby to move the radius filler along with the peel-away ply away from the tool radius portion to form a composite part having a smooth join surface in vicinity of the tool radius portion includes:
    demolding the at least one material layer including the peel-away ply with the radius filler attached to the peel-away ply.

11. The method of claim 1 further comprising:
    applying a tacky substance in vicinity of the tool radius portion to allow the tacky substance to maintain position of the radius filler relative to the tool radius portion.

12. The method of claim 11 wherein applying a tacky substance to the tool radius portion to allow the tacky substance to maintain position of the radius filler relative to the tool radius portion includes:

applying a liquid adhesive in vicinity of the tool radius portion.

13. A composite-part manufacturing method comprising:
placing a bladder against a tool comprising a first tool radius portion elongating between a first trough surface and a first major surface of the tool and a second tool radius portion elongating between a second trough surface and a second major surface of the tool;
placing a first radius filler in vicinity of the first tool radius portion;
placing a second radius filler in vicinity of the second tool radius portion;
applying a peel-away ply over at least a portion of the bladder, the first radius filler, the second radius filler, the first major surface, and the second major surface;
applying at least one material layer on the peel-away ply; and
after the at least one material layer has been applied on the peel-away ply, moving the peel-away ply away from the bladder, the first major surface and the second major surface, thereby moving the first radius filler along with the peel-away ply away from the first tool radius portion and the second radius filler along with the peel-away ply away from the second tool radius portion to form a composite part having a smooth join surface in vicinity of the first tool radius portion and the second tool radius portion.

14. The method of claim 13 wherein the placing the first radius filler in vicinity of the first tool radius portion comprises:

placing a thermoset resin in vicinity of the first tool radius portion.

15. The method of claim 14 wherein the placing the thermoset resin in vicinity of the first tool radius portion comprises:

placing a thermoset resin that contains at least some carbon fiber as reinforcement material in vicinity of the first tool radius portion.

16. The method of claim 13 wherein the applying the peel-away ply over at least a portion of the bladder, the first radius filler, the second radius filler, the first major surface, and the second major surface filler comprises:

applying a pre-cured material layer comprising the peel-away ply over at least a portion of the bladder, the first radius filler, the second radius filler, the first major surface, and the second major surface.

17. The method of claim 16 wherein the applying the pre-cured material layer comprising the peel-away ply over at least a portion of the bladder, the first radius filler, the second radius filler, the first major surface, and the second major surface comprises:

applying the pre-cured material layer over the first radius filler and the second radius filler such that the peel-away ply faces the first tool radius portion and the second tool radius portion, and is in direct contact with the first tool radius portion and the second tool radius portion.

18. The method of claim 13 wherein the applying the peel-away ply over at least a portion of the bladder, the first radius filler, the second radius filler, the first major surface, and the second major surface comprises:

applying the peel-away ply in direct contact with the first radius filler and the second radius filler.

19. The method of claim 13 wherein the applying the at least one material layer on the peel-away ply comprises:

applying at least one curable material layer on the peel-away ply.

20. The method of claim 19 further comprising:

allowing the at least one curable material layer to cure.

* * * * *